United States Patent [19]

Shimizu

[11] Patent Number: 4,627,116
[45] Date of Patent: Dec. 9, 1986

[54] COMPOST TOILET APPARATUS

[76] Inventor: Hiroshi Shimizu, 24-19, Uedatsutsumi 1-chome, Morioka-shi, Iwate-ken, Japan

[21] Appl. No.: 724,853

[22] Filed: Apr. 18, 1985

[30] Foreign Application Priority Data

Apr. 18, 1984 [JP] Japan .................................. 59-78920

[51] Int. Cl.⁴ .............................................. A47K 11/02
[52] U.S. Cl. ...................................... 4/111.6; 4/111.1; 4/111.5; 4/DIG. 12; 210/86; 210/173
[58] Field of Search .................. 4/111.1, 111.2, 111.6, 4/459, 449, DIG. 12, 319, 320; 210/86, 97, 104, 178, 173, 208, 179

[56] References Cited

U.S. PATENT DOCUMENTS

| | | | |
|---|---|---|---|
| 3,064,816 | 11/1962 | Griswold | 210/104 |
| 3,472,390 | 10/1969 | Pall et al. | 4/320 |
| 3,859,672 | 1/1975 | Modig | 4/111.1 |
| 3,959,829 | 6/1976 | Nordgren | 4/111.2 |
| 4,054,519 | 10/1977 | Tufts | 210/208 |
| 4,196,477 | 4/1980 | Stewart | 4/111.1 |
| 4,230,578 | 10/1980 | Culp et al. | 210/86 |
| 4,364,130 | 12/1982 | Persson | 4/111.1 |
| 4,471,916 | 9/1984 | Donaldson | 210/173 |
| 4,499,614 | 2/1985 | Yeagley | 4/111.1 |

FOREIGN PATENT DOCUMENTS 0107633  2/1984  European Pat. Off. ............. 4/111.1

Primary Examiner—Stephen Marcus
Assistant Examiner—Linda J. Sholl
Attorney, Agent, or Firm—Browdy and Neimark

[57] ABSTRACT

A compost toilet apparatus is disclosed, in which a box-like container for reserving raw sewage is divided into a fermentative chamber and a reservoir chamber, additives such as beet moss are dumped into the raw sewage reserved in the container so that the mixture of the additives and raw sewage is subjected to aerobic fermentation by a stirring unit and a blower, and the water content in the raw sewage is evaporated by the fermentative heat to produce an approximately granular mixture. The mixture is reserved in the reservoir chamber, while germs, parasites or the like in the container are killed by the fermentative heat. As a result, the raw sewage can be simply hygienically disposed.

7 Claims, 4 Drawing Figures

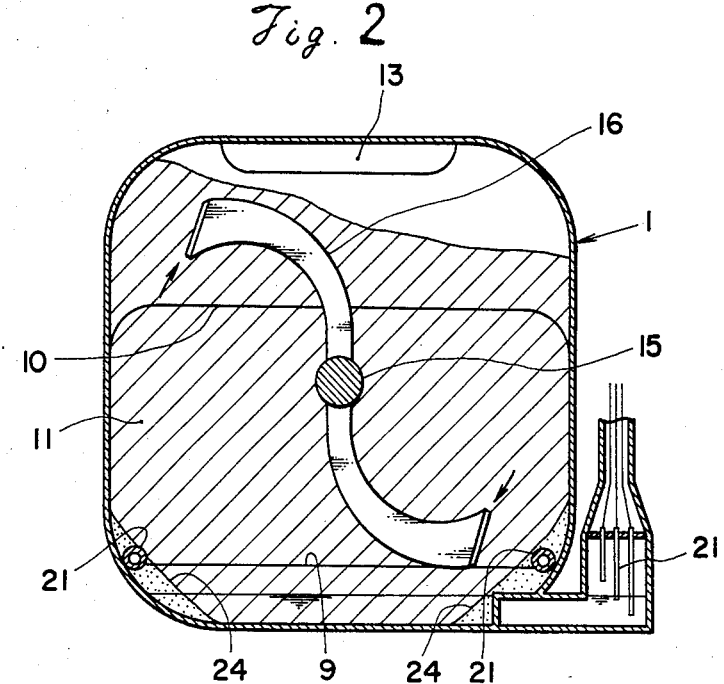
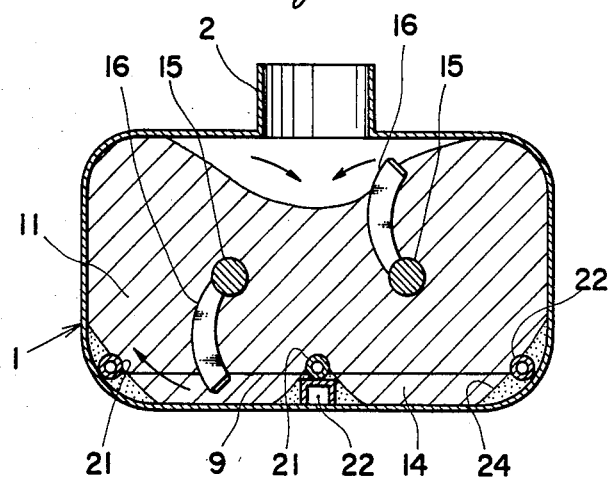

COMPOST TOILET APPARATUS

BACKGROUND OF THE INVENTION

1. Field of the Invention

The present invention relates to a compost toilet apparatus for simply and hygienically treating raw sewage and, more particularly, to a compost toilet apparatus being capable of disposing raw sewage such that it has its water content evaporated by fermentative heat to be restored to the soil or the like.

2. Description of the Prior Art

An average daily amount of raw sewage per one person consists of 130 g of feces and 1.3 l of urine, the latter being more than the former including even toilet tissue. The raw sewage is usually disposably discharged into a sewerage or reserved in sewage disposal apparatus for disposing the raw sewage in areas where the sewerage is not completely provided.

Such sewage disposal apparatus is disclosed in the U.S. Pat. No. 4,196,477, for example. This apparatus has a reservoir container for feces and urine which is provided with a rack. A stirrer is provided in the rack. Solid part sifted out of the rack and liquid part filtered through the rack are received on the lower tray and dried by warm air to be taken out. This apparatus can be formed compact; however, it has a serious diadvantage in bad smell.

Also, some other sewage disposal apparatuses have been proposed. In these apparatus, raw sewage dropped from toilet stools and having its water content amount adjusted is mixed with additives such as beet moss for fermenting the raw sewage. The mixture of the sewage and additives is stirred and mixed by a screw system stirrer to be transferred to a reservoir container where it is subjected to aerobic fermentation. Then it is dried into a solid stage for disposal.

The prior apparatus, however, cannot sufficiently evaporate the water content of sewage with fermentative heat to provide particulate sewage since the fermentation is not sufficiently carried out, and anaerobic decomposition sometimes occurs in the lower layer of the apparatus by defective ventilation.

SUMMARY OF THE INVENTION

A primary object of the present invention is to provide a compost toilet apparatus in which raw sewage can be sufficiently fermented to be powdered in a container.

A further object of the present invention is to provide a compost toilet apparatus which can minimize the necessary amount of additives.

A still further object of the present invention is to provide a compost toilet apparatus which does not give out bad smell.

The above-mentioned and other objects and features of the invention will become apparent from the following detailed description taken in conjunction with the drawings which indicate embodiments of the invention.

BRIEF DESCRIPTION OF THE DRAWINGS

FIG. 2 is a longitudinal sectional side view of a container;

FIG. 4 is a longitudinal sectional side view of the second embodiment.

DESCRIPTION OF THE PREFERRED EMBODIMENTS

Figure 1:
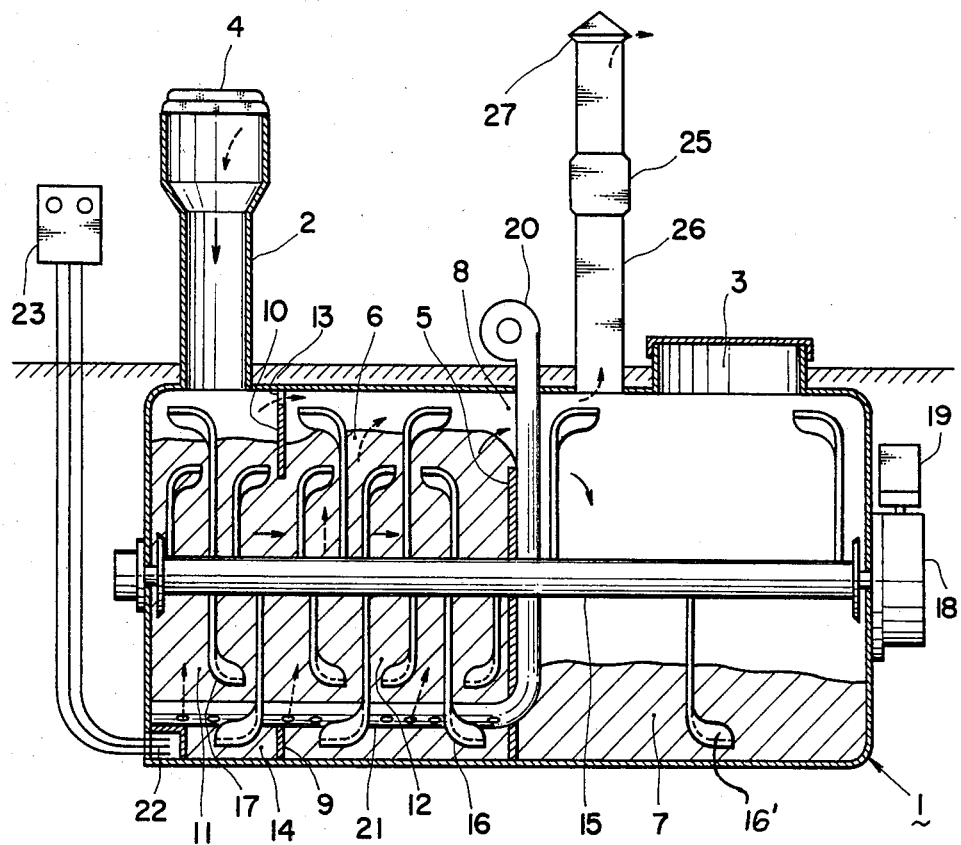
FIG. 1 is a partially developed sectional view showing a first embodiment of an apparatus according to the present invention.

FIGS. 1 and 2 show a first embodiment of the present invention. Reference numeral 1 designates a box-like container which is usually embedded in the earth below a toilet. On the upper portion of one side of the container 1 is provided a chute pipe 2 connected to a toilet stool 4 and on the upper portion of the other side of the container 1 is provided a take-out port 3. In the approximately central portion between the fore-aft ends of the container 1 is provided a vertical wall 5 for dividing the container 1 into a front fermentative chamber 6 and a rear reservoir chamber 7. The wall 5 rises from the bottom wall of said container 1. The upper end of the wall 5 does not reach the upper wall of the container 1 to provide some openings formed into an outflow port 8. Further, while a single container 1 which is divided into two chambers by the wall 5 is shown in the drawing, the fermentative chamber 6 and reservoir chamber 7 may be constituted from independent containers respectively and connected to each other through a connecting member similar to the outflow port 8.

The fermentative chamber 6 is provided on the bottom surface with a lower partition plate 9 erected vertically and on the upper wall with an upper partition plate 10 depending from the inside of the upper wall. The lower and upper partition plates 9, 10 are approximately parallel to said wall 5 and opposed to each other through a gap. As a result, said fermentative chamber 6 is divided into a stirring fermentative chamber 11 and a drying fermentative chamber 12 by the lower and upper partition plates 9, 10. The stirring fermentative chamber 11 and drying fermentative chamber 12 have capacities in total corresponding to 5-40 days of reserving period sufficient to ferment and dry raw sewage dropped through the chute pipe 2 and mixed with additives such as beet moss. The stirring fermentative chamber 11 is provided on the bottom with a water tank 14 defined by the lower partition plate 9. Therefore, water content freed from the raw sewage is reserved to be prevented from outflow into the drying fermentative chamber 12. The upper partition plate 10 prevents the raw sewage from being sent directly to the reservoir chamber 7 from the chute pipe 2 through the outflow port 8. A vent port 13 is provided in the upper partition plate 10 to connect the stirring fermentative chamber 11 to the drying fermentative chamber 12.

In the approximately central portion of the container 1 is provided a stirring shaft 15 extending in the fore-aft direction. A plurality of long stirring claws 16 and short stirring claws 17 are mounted on the stirring shaft 15 to transfer the mixture of raw sewage and additives sequentially to the reservoir chamber 7. Stirring claws 16' stir the mixture within the reservoir chamber 1 to cause further fermentation and drying. As shown in the developed view of FIG. 1, the bends of the stirring claws 16, 17 are bent with a torsional angle sequentially in the opposite direction and formed with an angle of sweepback (lag angle to normal in rotational plane) over the approximately whole length not to be wound by foreign substances. A plurality of or continuous spirals may be used instead of the stirring claws 16, 17. However, when the spiral is used, both ends of the spiral need to be fixed to the shaft 15 and the winding of foreign substances around the spiral is increased.

A reduction gear 18 is connected to a projecting portion of the stirring shaft 15 from the container 1. A motor 19 is connected to the reduction gear 18. The motor 19 is operated by a timer or the like for 15 minutes every 3 hours for example to drive the stirring shaft 15 with low speed.

The stirring fermentative chamber 11 and drying fermentative chamber 12 are provided on the lower portions with a perforated draft pipe 21 to which is connected a blower 20. In said water tank 14 is provided a sensor 22 to which is connected an indicator 23. When the level of water in the water tank 14 exceeds a certain value, the sensor 22 detects it to light a signal lamp on the indicator 23 and urges to put additives through the chute pipe 2. Also, when the level of water is elevated up to a certain value just before it exceeds the lower partition plate 9 due to the negligence of putting the additives, the indicator 23 lights a warning light and buzzes a buzzer by the signal of the sensor 22 for warning to urge the addition of additives. A layer 24 of granular conglomerate encloses the draft pipe 21 and the sensor 22. An exhaust pipe 26 is provided near the wall 5 of the upper portion of the reservoir chamber 7. A ventilating fan 25 is provided in the exhaust pipe 26. An exhaust port is designated by reference numeral 27. Also, a valve may be provided on the upper portion of the exhaust pipe 26 without using particularly the ventilating fan 25 and interlocked with the stirring shaft 15 to be closed and opened respectively in operating and stopping said shaft 15.

Figure 3:
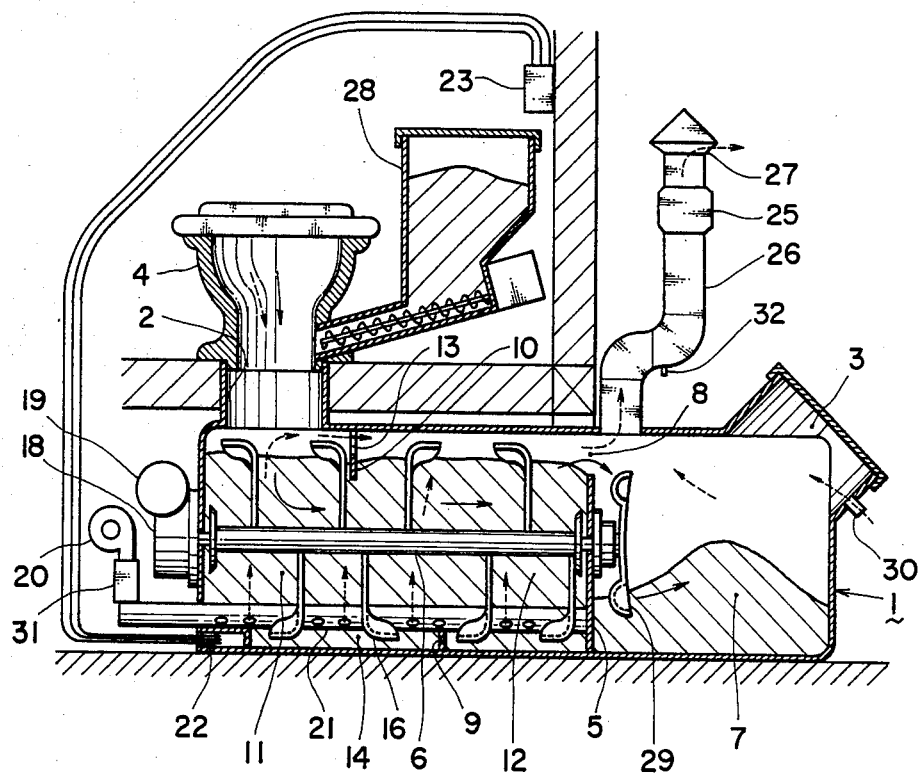
FIG. 3 is a partially developed sectional view of a second embodiment according to the present invention.

Next, will be described a second embodiment shown in FIGS. 3 and 4.

Reference numerals 1 to 27 are same as those described in FIGS. 1 and 2, provided the stirring shaft 15 is constituted from two shafts rotated in the opposite direction to each other and provided only in the fermentative chamber 6 within the container 1. Thus, the height of the container 1 can be formed lower and the stirrer 15 can be formed shorter. The upper and lower partition plates 9, 10 are not vertically opposed to each other. The lower partition plate 9 is provided near the wall 5. The stirring fermentative chamber 11 defined by the lower partition plate 9 is substantially larger than that of the embodiment shown in FIG. 1. In this case, the upper partition plate 10 may be omitted with little troubles.

An additive supply unit 28 connected to the chute pipe 2 supplies automatically additives through the chute pipe 2 into the container 1 on the basis of the signal of the sensor 22 when the water level in the water tank 14 exceeds a certain value. It also automatically stops the supply of additives to automatically control the water level when the water level is lowered. A thrust claw 29 is provided on a projecting portion of the stirring shaft 15 in the reservoir chamber 7 which is not provided with the stirring shaft 15, and carries out somewhat stir and unification in the reservoir chamber 7. A small diameter intake port 30 is connected to the interior of the reservoir chamber 7. A heater 31 is provided between the draft pipe 21 and the blower 20. A drain port 32 provided on the bend of the exhaust pipe 26.

Operation

Next will be described the operation of the present invention.

First, in the first embodiment, when raw sewage is dropped from the toilet stool 4 through the chute pipe 2 into the stirring fermentative chamber 11 in the container 1, it is stirred and mixed with additives added beforehand by the stirring claws 16, 17 rotated with low speed. The bends of the stirring claws 16, 17 attached to the stirring shaft 15 are bent with a torsional angle sequentially in the opposite direction, as shown in the developed drawing of FIG. 1, so that the raw sewage and additives are pivoted while being moved largely and staggeredly to be satisfactorily mixed similarly to those in a spiral system claw ribbon stirrer.

As a result, while the fermentation of the mixture is rendered inert by the shortage of water content when the percentage of water content is less than 38%, beet moss or like additives has satisfactory water holding property and water passing property so that a satisfactory percentage of water content (about 70% wb) is held with water content supplied through the chute pipe 2 and water content exceeding that percentage is drained to be reserved in the water tank 14 located right below the chute pipe 2. While the water in the water tank 14 is pumped up by the action of the stirring claws 16, 17 when the stirring shaft 15 is driven, it naturally flows down to be reserved in the water tank 14 when the stirring shaft 15 is stopped. Therefore, the mixture in the stirring fermentative chamber 11 is always maintained at said percentage of water content (about 70% wb).

When additives are reduced by fermentation and the water level in the water tank 14 exceeds a certain value by water content, such as urine, the signal lamp on the indicator 23 is lit by the sensor 22. As a result, additives are added to prevent reserved water from exceeding the lower partition plate 9.

The mixture in the fermentative chamber 6 is subjected to a necessary amount of ventilation by air supplied through the draft pipe 21 from the blower 20 and promoted to be fermented. According to the result of experiments, the temperature of mixture in the drying fermentative chamber 12 is raised up to about 60° by fermentative heat. Noxious germs and parasites are almost killed by the fermentative treatment. Also, water content in the fermentative chamber 6 is evaporated by this fermentative heat. The evaporated water content is discharged from the exhaust port 27 in the direction of arrow shown by the dotted line together with air from the toilet stool 4 or the like by air supplied from the draft pipe 21 and sucked by the ventilating fan 25.

Since the fermentative chamber 6 has a sufficient capacity to reserve the mixture for a period of 5–40 days in which the mixture is sufficiently fermented and dried, the percentage of water content in the mixture is dried up to about 38% and reserved in the reservoir chamber 7 until the mixture overflows to the reservoir chamber 7 through the stirring and drying fermentative chambers 11, 12 and the overflow port 8 as shown by the solid line arrow. The mixture is simply dropped and deposited in the reservoir chamber 7. While the mixture may be dried by natural fermentation, it is further fermented and dried up to 20% of water content by the action of the stirring claw 16' to be taken out of the take-out port 3 usually once or twice a year in this embodiment.

Further, the conglomerate layer 24 is outside the rotationally operating area of the stirring claws 16, 17 to enclose the draft pipe 21 and the sensor 22. This layer prevents the draft pipe 21 and the sensor 22 from being loaded by the mixture and maintains ventilation from a wide area and entering and exiting of reserved water.

Next will be described the operation of the second embodiment in which the additives are automatically supplied. That is, when the water level in the water tank 14 exceeds a certain value, it is detected by the sensor 22 and the additives are automatically supplied from the chute pipe 2 into the container 1. When the water level is lowered, the supply of additives is automatically stopped to automatically control the water level. If the automatic supply would fail by the exhaustion of additives in a tank of the additive supply unit 28 or the like to abnormally elevate the water level in the water tank 14, the warning light on the indicator 23 is lit and the buzzer buzzes to urge any inspection. Thus, a necessary minimum amount of additives will be always supplied to make maintenance cost economical.

Since two stirring shafts 15 are used in the fermentative chamber 6, the weight of the container 1 can be formed lower than that in the first embodiment and the container 1 can be easily embedded below the floor of the toilet or the like. Also, after the mixture is transferred from the overflow port 8 into the reservoir chamber 7 as shown by the solid line arrow, it is unified, fermented and dried by the thrust claws 29 while being reserved.

Further, while sufficient ventilation is needed to satisfactorily ferment the mixture, usual forcible ventilation cools the fermentative heat to lower the temperature of the mixture and stop the sufficient fermentation. Hence, the ventilation in the room temperature is limited to 1 l of mixture/min.kg DM or less. However, when air supplied from the draft pipe 21 into the fermentative chamber 6 by the blower 20 is heated by the heater 31, the ventilation up to 30 l/min.kg DM can be carried out. That is, when heated up to 40° C., the mixture is maintained at 30° C. or more even after cooling to the saturated condition. Also, when the mixture is heated up to 110° C., since the heat resisting temperature of cellulase germs necessary for aerobic fermentation is about 78° C., ventilation up to 110° C. kills only fermentative germs very close to the draft pipe 21. As a result, the aerobic fermentation can be sufficiently expected.

Since the mixture heated to 40° to 110° C. can be subjected to the ventilation within the range of 1 to 30 l/min.kg DM without being cooled, the mixture in the stirring and drying fermentative chambers 11, 12 is not cooled to 30° C. or less to keep the fermentation active. Then it can be heated successively to 60° C. or more by the fermentative heat to permit a great amount of ventilation so that the evaporation of water content is promoted and the amount of additives can be reduced. Further, since the fermentation can be kept active even under the great amount of ventilation, an offensive smell is digested by germs in the mixture without being discharged.

Air supplied by the blower 20 is sucked by the ventilating fan 25 as shown by the dotted line arrow to be exhausted. At this time, since air sucked from the stirring and drying fermentative chambers 11, 12 has high temperature and humidity and is liable to dew, the ventilating fan 25 is connected to the container 1 near the wall 5 so as to dry the inside of the reservoir chamber 7 with fresh air from the intake port 30. The dewed water produced by cooling is discharged from the drain port 32 not to fall into the drying fermentative chamber 12 and the reservoir chamber 7 or the like.

What is claimed is:

1. A compost toilet apparatus, comprising:
   a container having a longitudinal axis, upper and lower walls, longitudinal end walls and side walls;
   a dividing wall, substantially perpendicular to said longitudinal axis, said wall extending from the bottom of said container to a position below the upper wall of said container, said dividing wall dividing said container into a fermentative chamber and a reservoir chamber, the space above said dividing wall comprising a connecting means for connecting said reservoir chamber to said fermentative chamber;
   an input port connected to the upper wall of said fermentative chamber;
   an output port connected to said reservoir chamber;
   a stirring shaft mounted horizontally and extending through said fermentative chamber in a longitudinal direction, said stirring shaft further extending through said dividing wall into said reservoir chamber;
   stirring means, attached to that portion of said stirring shaft within said fermentative chamber, for causing sewage dumped into said fermentative chamber through said input port to be directed toward said reservoir chamber through said connecting means while mixing the contents of said fermentative chamber; and
   mixing means connected to that portion of said stirring shaft extending into said reservoir chamber for mixing the contents of said reservoir chamber.

2. A compost toilet apparatus in accordance with claim 1, wherein said input port is disposed near the end wall of said fermentative chamber opposite said dividing wall, and further including a lower partition plate extending substantially vertically from the bottom wall of said fermentative chamber and parallel to the end walls thereof, said partition plate being disposed a sufficient distance from said end wall of said fermentative chamber opposite said dividing wall to create a tank between said end wall, said side walls and said partition plate at the lower portion of said fermentation chamber substantially below said input port.

3. A compost toilet apparatus according to claim 1, wherein said stirring shaft is on a horizontal spindle rotary system and said stirring means includes a plurality of long stirring claws having an angle of sweepback over almost the whole length thereof and a plurality of similar short stirring claws, said long stirring claws having on the ends thereof a torsional angle and bending direction opposite to that on the ends of said short stirring claws.

4. A compost toilet apparatus according to claim 2, further including sensor means for sensing the volume of water in said tank and an indicator means connected to said sensor means for indicating a predetermined condition of water in said tank sensed by said sensor means.

5. A compost toilet apparatus according to claim 4, further including additive supply means for automatically supplying additives into said fermentative chamber according to a signal of said sensor means.

6. A compost toilet apparatus according to claim 1, further including a draft pipe disposed at the bottom of said fermentative chamber and a blower connected to said draft pipe.

7. A compost toilet apparatus according to claim 6, further including a heater provided between said draft pipe and said blower.

* * * * *